United States Patent
Maihart

[11] 3,768,943
[45] Oct. 30, 1973

[54] APPARATUS FOR PRODUCING TUBULAR CYLINDRICAL BODIES OF HARDENABLE MOLDING COMPOSITIONS

[76] Inventor: Hans Maihart, Wels, Austria
[22] Filed: Oct. 28, 1971
[21] Appl. No.: 193,542

Related U.S. Application Data
[62] Division of Ser. No. 120,525, March 3, 1971.

[52] U.S. Cl............... 425/224, 425/329, 425/426, 425/435, 164/278
[51] Int. Cl.......................... B29d 7/14, B22d 11/06
[58] Field of Search................... 425/224, 329, 426, 425/435; 164/84, 85, 117, 87, 276, 298, 299, 301, 278

[56] References Cited
UNITED STATES PATENTS
| | | | |
|---|---|---|---|
| 1,444,953 | 2/1923 | Crane | 164/84 |
| 2,187,254 | 1/1940 | Wallace | 425/329 |
| 2,245,994 | 6/1941 | McWane | 164/117 |
| 2,657,428 | 11/1953 | Upton | 264/165 X |
| 3,080,831 | 3/1963 | Paitchell et al. | 425/329 |

Primary Examiner—R. Spencer Annear
Attorney—John J. McGlew

[57] ABSTRACT

The apparatus comprises a tubular mold which is rotatably supported on two sets of rollers, each comprising three rollers, which are mutually adjustable to accommodate molds of different diameters. A plurality of endless belts extend axially of the mold in contiguous relation circumferentially of the mold, conforming essentially to the inner generated surface of the mold, and these belts form the surface on which layer-forming components for producing the tubular cylindrical bodies are deposited. As the progressively formed body is withdrawn from the mold, the belts are drawn along with the body. A special supporting arrangement of spaced sets of rollers is provided exteriorly of the mold to support the body as it exits from the mold. Formation of a body is started by initially telescoping a short piece of pipe into the exit end of the mold and depositing the layer-forming components on the inner surface of this piece of pipe.

12 Claims, 7 Drawing Figures

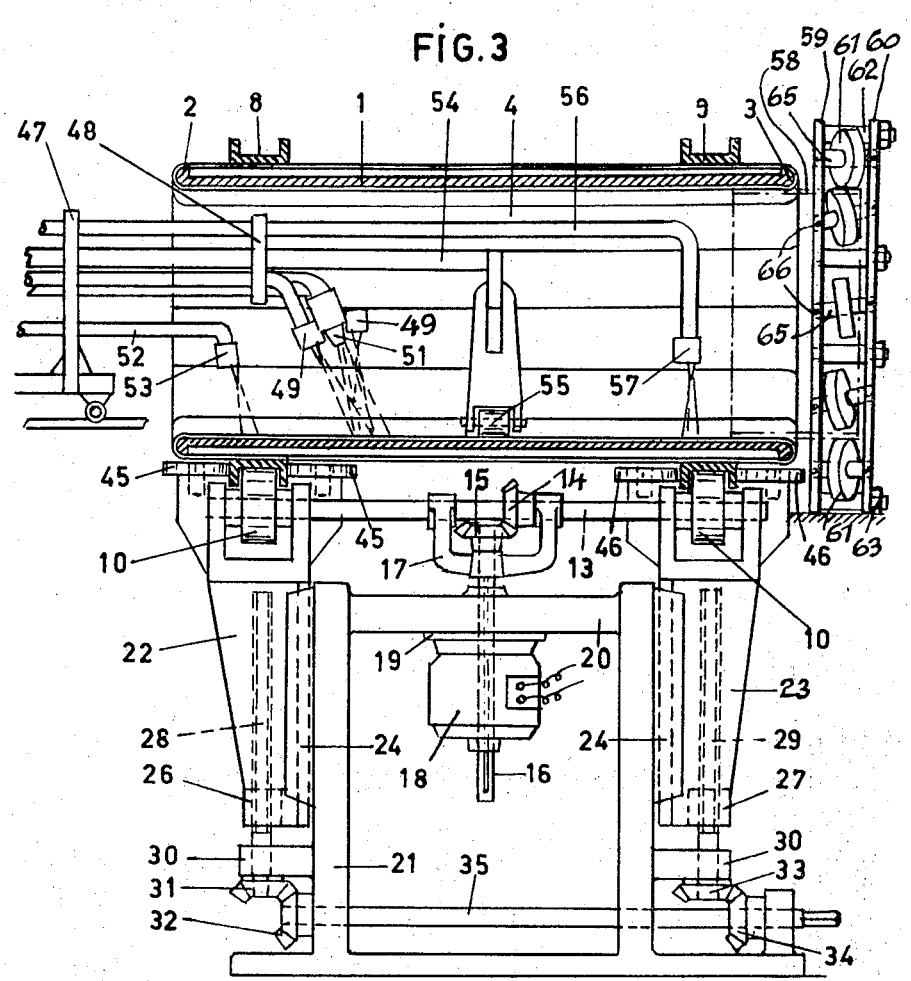

3,768,943

APPARATUS FOR PRODUCING TUBULAR CYLINDRICAL BODIES OF HARDENABLE MOLDING COMPOSITIONS

This is a division of application Ser. No. 120,525 filed Mar. 3, 1971.

BACKGROUND OF THE INVENTION

In a known apparatus for producing tubular cylindrical bodies, such as tower or silo walls, pipes, tanks, and the like, of hardenable molding compositions, a duroplast, such as a polyester resin or plastic concrete, either alone or with reinforcing fibers of high strength, is supplied separately to a rotating hollow mold but is applied in mixture on the inner generated surface of the mold and shaped into a uniform layer of desired wall thickness forming a tubular cylindrical body. After the solidification of the applied material, the formed, cylindrical tubular body is separable from the mold.

In this known apparatus, the plastic material is sprayed from nozzles which are movable back and forth axially in the interior of the mold, and is sprayed onto the inner generated surface of the rotating mold. The reinforcing fibers are supplied from nozzles separate from the nozzle supplying the plastic material but movable with the latter, and are intermixed under pressure, into the applied but still fluid plastic material. If hollow bodies comprising several layers are produced, then, after at least partial solidification of the layer already applied on the inner wall surface of the mold, the succeeding layers are supplied successively in a similar manner by reciprocating the nozzles axially of the interior of the rotating mold. After solidification of all the applied layers, the tubular cylindrical body which has thus been formed is removed from the mold, whereupon the next molding process can begin. Essentially, what is concerned in this known apparatus is a means whereby workpieces can be produced only singly and only of a length equal to the maximum length of the mold.

SUMMARY OF THE INVENTION

This invention relates to apparatus for the production of tubular cylindrical bodies of hardenable molding compositions and, more particularly, to a novel and improved apparatus whereby tubular cylindrical bodies can be produced in a desired length which is independent of the length of a rotating tubular cylindrical mold in which the tubular cylindrical bodies are formed.

The invention uses the known procedure of applying the molding composition and the reinforcing body to the inner generated surface of a rotating tubular cylindrical mold, so that tubular cylindrical walls, for example of duroplastics, either mixed with additives or not, can be produced continuous in any desired length and wall thickness. In accordance with the invention, this objective is obtained in that the fluid molding composition, and possibly also the additives such as reinforcing fibers of high strength, are applied from nozzles or the like near one end of the rotating tubular mold onto the inner generated surface thereof for the formation of an annular distributed layer. This layer is moved axially and continuously away from the application zone of the layer components at a rate of advance depending upon the rate of application of the layer components and the setting rate of the already-applied layer components, and during continuous rotation of the mold. The resulting formed tubular cylindrical body is continuously moved out of the opposite end of the mold, so that tubular cylindrical bodies of a desired length, which is independent of the length of the mold, can be produced by the formation of joints in the shell of the tubular cylindrical body.

With the invention apparatus, for example, pipes of extraordinary length and of any desired diameter can be produced, in that the fully-shaped and solidified pipe is supported at predetermined intervals outside the mold by roller bearings which promote or support its rotation and its forward movement.

In the invention, there may be used, as additives to the fluid-molding composition, textile glass fibers, carbon filaments, asbestos filaments, quartz yarns and steelfibers, or granular additives, such as quartz sand, vermiculite, expanding clay or the like. If desired, an intermediate layer of a light building material or other suitable material may be inserted between two fiber-reinforced plastic layers.

To attain this effect, in a further feature of the invention, the full wall thickness of the tubular cylindrical body is obtained by successive application, at intervals of space or time, of several layers comprising either the same materials or different materials which increase the insulation properties of the formed body, or its resistance to chemical or mechanical influences, on the mold, or respectively, on at least partially solidified already deposited layers in the mold.

The apparatus includes a known construction comprising a tubular cylindrical mold supported on motor-driven rollers for rotation about a horizontal axis, and an applicator protruding into the interior of the mold and containing the application elements. These application elements comprise separate channels or conduits for the molding composition and for the reinforcing fibers or other additives, but all the applied materials are directed to one zone of application on the inner generated surface of the mold.

To perform the invention, this known device is modified by providing the tubular cylindrical mold with a number of endless belts which are arranged in contiguous relation circumferentially of the mold and which extend longitudinally of the mold. The cross sections of these belts, within the mold, form a closed, tubular cylindrical travelling wall. The belts are trained around rounded profiles at the ends of the mold, or may be trained around rollers at the ends of the mold, so that the belts form endless paths or webs. The belts are entrainable solely by the already solidified tubular cylindrical body subjected, for example, to the action of a screening rolling device, a traction device, or the like, and moved at a predetermined rate of advance. In addition to the applicator which is freely movable axially of the interior of the mold, an additional applicator extends into the interior of the tubular cylindrical body, and may comprise additional coating means, or a rolling device for compacting the formed layers, mounted on cantilever beams of a supporting device.

It is particularly advantageous to use travelling belts of a synethetic resin composition, such as silicone rubber, Teflon, polyethylene, or the like, or else to provide belts or films, or foils with a coating of the mentioned materials.

In order that tubular cylindrical bodies of different diameters can be produced with the apparatus, as a further feature of the invention, each roll or wheel supporting the tubular mold or effecting its rotation is displaceable radially of the mold axis and fixable in adjusted position, so that between these wheels, which are offset, for example, by an angle of 120° circumferentially of the mold, molds of any diameter can be inserted interchangeably.

An object of the invention is to provide an improved apparatus for producing tubular cylindrical bodies from a hardenable molding composition.

Another object of the invention is to provide such an apparatus capable of producing tubular cylindrical bodies of a hardenable plastic composition of a desired length which is independent of the length of a tubular cylindrical mold in which the bodies are formed.

A further object of the invention is to provide such an apparatus which is capable of producing tubular cylindrical bodies of any desired diameter.

For an understanding of the principles of the invention reference is made to the following description of a typical embodiment thereof as illustrated in the accompanying drawing.

BRIEF DESCRIPTION OF THE DRAWING

In the Drawing:

FIG. 3 is a side elevation view, with the mold being shown in axial section, of apparatus embodying the invention;

FIG. 5 is a partial diametric sectional view of the mold illustrating the endless belts;

DESCRIPTION OF THE PREFERRED EMBODIMENT

Figure 4:
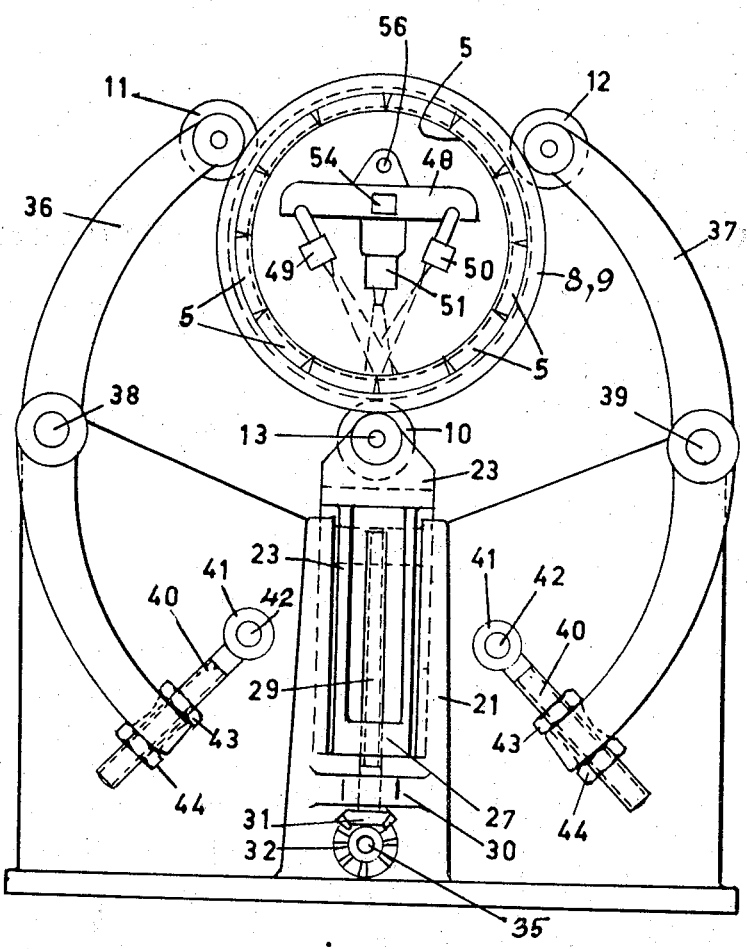
FIG. 4 is an end elevation view of the apparatus shown in FIG. 3.
Figure 6:
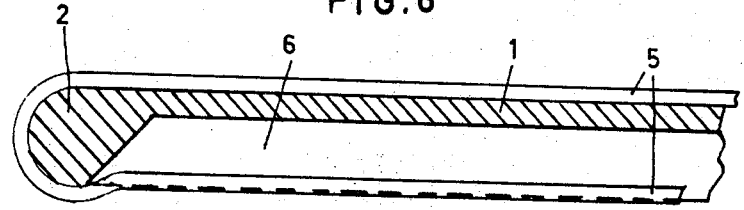
FIG. 6 is a fragmentary axial sectional view of the mold, at one end, illustrating a profile over which the endless belts are trained.

Referring first to FIGS. 3 and 4, apparatus for performing the process of the invention comprises a tubular cylindrical mold 1 whose end surfaces are in the nature of flange rings 2 and 3 extending somewhat radially outwardly and having a semicircular cross section. The length of mold 1 is determined by the length of the successive work phases which are necessary for the uninterrupted production of a tubular cylindrical body, for example, a pipe, a silo body, a tank, a tower or a mast constructed, for example, of a duroplastic, plastic concrete or similar material with or without additives.

The inner generated surface of mold 1 is covered by an endless travelling wall 4 embracing the longitudinal extent of the mold and movable in the direction of movement of the solidified tubular body layer. Wall 4 comprises a number of endless travelling belts 5 which have a straight stretched profile but enough elasticity or flexibility so that, under the centrifugal force of the rotating mold 1 and under the pressure of the applied composition inside the mold, belts 5 rests snugly against the inner cylindrical surface of the mold. If the travelling belts have a thickness of more than 5 mm, and if the sum of the belt widths is selected to be somewhat greater than the internal circumference of mold 1, the travelling belts press into the mold in vault fashion. In this state, travelling belts 5, lying in contiguous relation or possibly overlapping slightly, if the thickness of foils form a closed application surface for the composition to be applied.

Belts 5 are formed of silicone rubber, Teflon, polyethylene, or the like, or may be of belts of high tensile strength coated with these materials. In order to provide enough space for the back-travelling runs of belts 5 adjacent the outer cylindrical surface of mold 1, there are provided, between the backwardly travelling belts 5, supporting ribs 6 extending radially outwardly from the mold and longitudinally thereof. These ribs define segment-type profile cavities 7 which exceed the width of a respective travelling belt 5. Since belts 5 are held substantially taut by the annular beads 2 and 3 at the ends of mold 1, the belt sections externally embracing the mold are maintained freely suspended in cavities 7.

Near each end of mold 1, there is fixed, on supporting ribs 6, a race or runway 8 or 9, for example of U-shaped cross section. Races or runways 8 and 9 serve to receive two wheel sets 10, 11, 12, each comprising three wheels or rollers staggered by 120° circumferentially of mold 1. The lower wheels 10 of the two-wheel sets are fixed to each other by a shaft 1 to which is secured a bevel gear 14 engaging in a bevel gear 15 secured on the vertical shaft 16, the gears 14 and 16 being embraced by a common bearing body or housing 17. Vertical shaft 16 extends through the hollow or tubular shaft of a drive motor 18, and shaft 16 has either a longitudinally extending key engaging a keyway in the drive motor shaft or has a longitudinally keyway receiving a key projecting from the drive motor shaft. Motor 18 is supported by a mounting flange 19 on a bridge 20 of a standard 21.

Each of the two wheels 10 drivable by motor 18 is mounted, together with shaft 13, in carriages 22 and 23 which are displaceable in respective vertical guides 24, 24 of standard 21. Each carriage 22, 23 has a respective spindle nut 26, 27 threadedly engaged with a respective threaded spindle 28, 29. Each spindle is mounted for rotation, but fixed against axial displacement, in a respective bracket 30 extending horizontally from standard 21. Both spindles 28, 29 are in positive connection, through the medium of respective gear pairs 31, 32 and 33, 34, with a common drive shaft 35, and can thus be rotated simultaneously for simultaneous height adjustment of both wheels 10. During such height adjustment, shaft 16 slides axially of the tubular drive shaft of motor 18 but remains in rotational connection with this hollow drive shaft.

Wheels 11 and 12 of the wheel sets are rotatably mounted at the end of one arm of a respective two-arm level 36, 37, and each lever 36, 37 is mounted, for pivotal movement in a vertical plane, on a respective horizontal shaft 38, 39 fixed in standard 21. Wheels 11 and 12 face each other in the same vertical plane in which there is provided the respective correlated race 8, 9 of mold 1. The lower end of the lower lever arm of each two-arm lever 36, 37 is formed with a bore traversed, with clearance, by a threaded spindle 40 which is freely movable in the bore. Each threaded spindle 40 is mounted, by a respective articulated head 41, on a respective bolt 42 of standard 40 and has threadedly engaged therewith two respective nuts 43, 44. By means of these nuts, the upper arms of levers 36, 37 and thus the associated wheels or rollers 11, 12 are pivotable either toward or away from the races 8, 9, and are fixable in each adjusted relative position. Thus, the device can be adjusted to any mold diameter so that, by the exchange of molds of different diameter, tubular cylindrical bodies of different diameters can be produced continuously with the apparatus.

It will be noted further that races 8 and 9 are also secured against axial movement by lateral wheels 45, 46 rolling against their side edges or flanges, and thus mold 1 is held in place, and rotatable, counter to the axial thrust action exerted on mold 1 by the tubular cylindrical body during its production.

The applicator comprises essentially a supporting frame 47 which is movable longitudinally within mold 1, for example, by means of a truck. Frame 47 has a yoke 48 supporting two fluid plastic spray nozzles 49, 50 and a blowing nozzle 51 for the reinforcing fibers. Additionally, frame 47 carries a cantilever beam 52 at whose free end there is fixed a spray nozzle or the like 53 for the application of a possibly colored external layer, and carries a cantilever beam 54 supporting a device 55 for rolling the still soft layers of the deposited material and for smoothing the layer surface. Finally, frame 47 carries a cantilever beam 57 supporting a spray nozzle 58 for applying an internal layer to the tubular cylindrical body. All of the layer applying devices, together with the rolling device, are movable longitudinally within the interior of mold 1, either singly or conjointly, so as to produce the first section of a tubular cylindrical body in mold 1 and at the beginning of the continuous process.

Before the start of a new operation for producing a tubular cylindrical body uninterruptedly, for example, a piece of pipe 58 is disposed at the discharge end of mold 1 in such a way that it extends, with a sliding fit, into mold 1 throughout a portion of its length. However, a substantial length of the pipe piece 58, serving as a traction element, extends outwardly of the discharge end of mold 1 and into the zone of a feeding device moving the manufactured tubular cylindrical pipe outwardly at a predetermined rate of advance.

The feed device may comprise, for example, a stationary bearing race 59,60 and a number of wheels or rollers 61 rotatably mounted in the walls of the race and with their axles in a circle concentric with the bearing race. Walls 59,60 of the bearing race are rigidly interconnected by spacer bolts 62 which are fixed, by threaded pins, in threaded apertures in one of the two race walls, for example the wall 59. The other race wall, for example the wall 60, has, instead arcuate slots for each spacer bolt and through which a threaded pin of the respective spacer bolt passes and is securable by means of a nut 63. When nuts 63 are loosened, race wall 60 is adjustable relative to race wall 59 throughout the length of the arcuate slots, and is securable in each relative position by tightening nuts 63.

Axles 64 of wheels or rollers 61 are mounted rotatably in bushings 65, ball bearings, or the like, and these bushings 65, or ball bearings, are pivotable about respective articulated axles 61 directed radially toward the center of the race 59,60. Since each axle 64 for a wheel or roller 61 is pivotably mounted in two bushings 65, each pivotable about a respective articulated axle 66, the axles of all of the wheels of the rollers of the feed device can be adjusted simultaneously, within certain limits, into any desired angular position with respect to the normal position by relative displacement of race wheel 60 with respect to race wall 59. The result is that wheels or rollers 61 are adjustable at an angle to the generatrix of the cylindrical surface of pipe piece 58 or, respectively, to the already solidified section of a tubular cylindrical body 67 still being produced in continuous operation, and thus exert, on the tubular cylindrical body during its rotation, a screw action which will be the greater as the angle of attack of the wheels or rollers 61.

By this screw action of wheels or rollers 61, the magnitude of the advance of tubular cylindrical bodies 67 being produced is determined, as this is dependent on the quantity of layercomponents applied per second or the rate of deposition, and on the setting rate of the tubular cylindrical body section formed. Such feed devices must support the shaped tubular cylindrical body 67 at spaced intervals, and must effect its forward movement as a resultant of its rotation. Naturally, in some cases, it may be advantageous to drive rollers 61 of the feed device by motor, adapting the speed of rotation of the wheels or rollers to the speed of rotation of the formed tubular cylindrical body.

Figure 1:
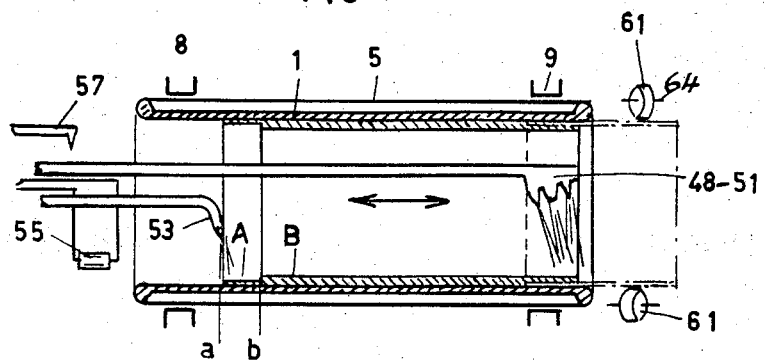
FIGS. 1 and 2 are longitudinal or axial sectional views illustrating two different work phases of the invention apparatus.
Figure 2:
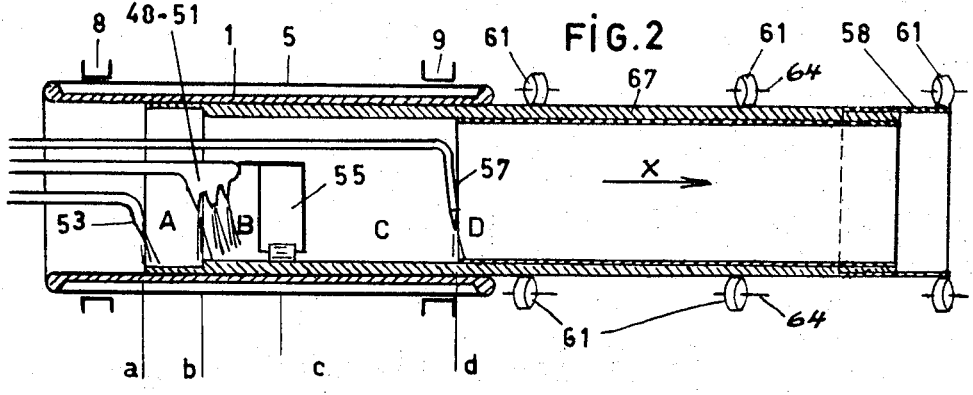

The operation of the described apparatus in performing the invention will now be explained with reference to FIGS. 1 and 2 of the drawing. At the beginning of an operation for producing a tubular cylindrical body, and as explained above, a short pipe section 58 is telescoped into the discharge end of mold 1 for a portion of its length, so that the outwardly projecting portion of the pipe section can be gripped by the first feed device 59 – 66, if a portion of the tubular cylindrical body 67 has already been produced in mold 1 and is now to be extracted from the mold at a certain rate of advance. During the formation of the first section of the tubular cylindrical body, as shown in FIG. 1, initially nozzle 53, for applying an external layer A, is reciprocated once lengthwise of mold 1, and then nozzle group 49,50,51 for applying, for example, a duroplast composition reinforced with fibers, is advanced through the mold in the same manner but is retracted only to a point marked b. Then the layer B thus formed is compacted and smoothed by rolling the surface, and, finally, by longitudinal motion of nozzle 57, the application of an internal layer D on layer B is effected. The three superposed layers A, B, and D provide the wall thickness of the tubular cylindrical body and which extends over a portion of pipe section 58 and firmly unites therewith on setting.

Now, the first feed device 59 – 66 is made operative on pipe section 58, and rolls 61 engage tubular cylindrical body 67, which is continuously rotating, under a certain contact pressure and effect, due to their angular position relative to the diametric plane of the body 67, helical detachment thereof from mold 1 at a predetermined rate of advance, moving travelling wall 4 longitudinally of mold 1. From this moment, the novel process of the invention, as shown in FIG. 2, starts.

Nozzle 53, for applying external layer A, is positioned at point a, nozzle group 49 – 51, for applying the layer-forming material including the synthetic fiber to form layer B, is positioned at point b, rolling device 55, for compacting the surfaces of the layers and for smoothing them, is positioned at point c, and nozzle 57, for applying the internal layer D is already close to the discharge end of mold 1 at point d. It should be noted that, during rotation of mold 1 and of the already-produced tubular cylindrical body 67, the latter moves axially toward the discharge end of the mold at a predetermined rate of advance and moving travelling wall 4 axially as indicated by the arrow x, and during this rotational and lengthwise movement of the progressively formed tubular cylindrical body, the application of the various layer-forming materials occurs simultaneously and continuously.

The axial spacings of the starting point a to d are so selected that, between the individual work steps a to d, there is a sufficient time delay for the solidification of the applied layer. As an example, it may be mentioned that, after the application of, for example, Gelcoat, as the external layer, from the starting point a of nozzle 53 to the starting point b of nozzle combination 49 – 51, there is a time lapse of about 4.12 minutes and, after application,for example of the laminate consisting of a duroplast and fibers, there is a time lapse of 2 minutes before the formed layers A and B are compacted and rolled smooth. Between the start of rolling device 55 at point c and the application of internal layer D, for example of Topcoat, occurring at point d through the medium of nozzle 57, there is a time lapse of about 8 minutes. At a constant rate of advance of formed tubular cylindrical body 67 and of travelling rate 4, the setting or solidification rates of the coating materials used in forming the body can be taken into account by a preselected adjustment of the distances of starting point a to d.

In particular, in the application of reinforcing fibers, it is possible, by regulation of the ratio of the speed of rotation of mold 1 and of the rate of advance of the tubular cylindrical body to be formed, to regulate the position of the supplied fibers in the formed layer at the moment of their impingement upon mold 1 or, respectively, on a formed layer, in order thereby to impart certain properties to the tubular cylindrical body. The body 67 projecting from the discharge end of mold 1 is supported, at spaced intervals, by feed devices 59 – 66, and thereby protected from damage.

Figure 7:
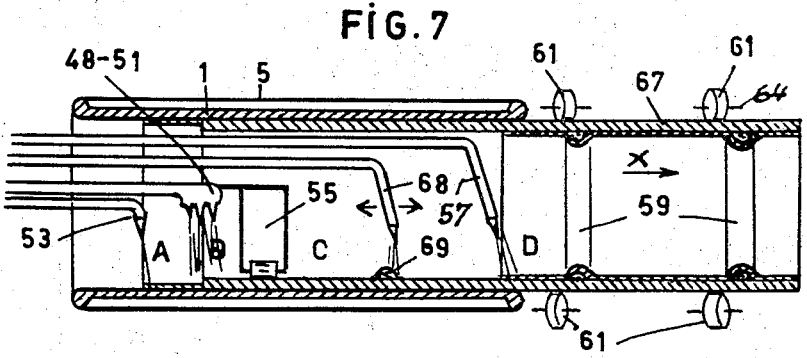
FIG. 7 is a view similar to FIGS. 1 and 2 illustrating the production of a tubular cylindrical body having internal circumferentially extending beads or ribs.

It should be mentioned, by way of example, that this apparatus is also useful for producing tubular cylindrical bodies 67 having radially inwardly extending annular protrusions 69, axially spaced from each other, and which may be annular ribs, annular steps, or reinforcement toruses which rise conically and fall off conically. This may be effected by applying, for example, polyurethane foam at preselected axial spacings by means of a controllable applicator nozzle 68, as shown in FIG. 7. These annularly extending internal protrusions are formed immediately after the smoothing and compacting of layers A and B, and on the latter, and only then is internal layer D applied by means of nozzle 57. Thus, the internal annular protrusions are also coated with a cover layer.

It is believed not necessary to describe in detail that, by matching the rate of application of the coating composition and the rate of advance of the body 67, the wall thickness of the latter is determinable. Furthermore, so-called "sandwich" pipes can be produced by the invention process. In such case, there is used, as the first layer, for example Gelcoat, and, as the second layer, for example, a laminate formed of duroplast and fibers. Both layers are again compacted and smoothed by rolls and coated with a layer consisting, for example, of polyurethane foam. Then there is applied over this layer an internal layer, for example of a duroplast mixed with reinforcing fibers. Such a pipe has an extraordinary resistance to mechanical or chemical actions.

In any event, variation in the means for implementing the invention is almost unlimited, and it is possible to produce tubular cylindrical bodies in all lengths and diameters, as well as in all wall thicknesses, from hardenable moldable compositions and in a continuous operation.

While a specific embodiment of the invention has been shown and described in detail to illustrate the application of the principles of the invention, it will be understood that the invention may be embodied otherwise without departing from such principles.

What is claimed is:

1. In apparatus for the production of tubular cylindrical bodies, such as tower or silo walls, pipes, tanks, masts and the like of hardenable molding compositions, wherein a polyester resin or plastic concrete, either alone or with additives such as reinforcing fibers of high strength, is supplied separately to a rotating tubular cylindrical mold and applied in mixture on the inner generated surface of the mold and shaped into a uniform layer of desired wall thickness forming a tubular cylindrical body, after solidification of which the formed body is extracted from the mold, and of the type including a tubular cylindrical mold supported on motor driven roller means for rotation about a horizontal axis and a longitudinally dislaceable applicator including applicator elements extending into the interior of the mold, with the applicator having separate supply lines for the fluid molding composition and the additives, but with all supply lines being directed toward a single zone of application on the inner generated surface of the mold: the improvement comprising, in combination, a plurality of endless travelling belts extending longitudinally of said mold and embracing the cylindrical wall thereof, said belts being arranged in laterally contiguous relation throughout the circumference of said mold and being trained about the opposite circular ends of said mold; said belts conjointly forming, in the circumferential direction of said mold, a closed travelling wall offering, to the applied tubular cylindrical body layer, a mold wall entrained thereby in the axial direction at the rate of advance of such layer; said longitudinally displaceable applicator including further applicator elements positioned within the interior of the mold at axial spacings from each other and staggered relatively to each other; and at least one feed device spaced from the discharge end of the mold and concentric with the axis of the produced tubular cylindrical body, said feed devices being spaced axially from each other and engaging the solidified portion of the shaped tubular cylindrical body to advance the solidified portion axially along with said travelling wall at a predetermined rate of advance.

2. In apparatus for the production of tubular cylindrical bodies, the improvement claimed in claim 1, in which said additional applicator elements include a device for compacting and smoothing the formed layer.

3. In apparatus for the production of tubular cylindrical bodies, the improvement claimed in claim 1, including a plurality of circumferentially spaced and longitudinally extending supporting ribs extending radially from the external periphery of said mold and engaging races included in said roller means; each supporting rib extending between the backward travelling runs of a respective pair of said belts; the opposite ends of said mold being formed with curvilinearly profiled circumferential ribs extending radially outwardly of said mold, over which said belts are trained; the backward runs of said belts extending, with play, between pairs of adjacent supporting ribs and beneath said races.

4. In apparatus for the production of tubular cylindrical bodies, the improvement claimed in claim 1, in which the material of said travelling belts is a synthetic resin.

5. In apparatus for the production of tubular cylindrical bodies, the improvement claimed in claim 1, in which the material of said travelling belts is a material having a high tensile strength and which is surface-coated with a synthetic resin material.

6. In apparatus for the production of tubular cylindrical bodies, the improvement claimed in claim 1, in which the lateral dimensions of said belts are such that the sum of the belt widths is somewhat greater than the length of the inner circumference of said mold, and the thickness of said belts is sufficiently large that the belts press laterally against each other firmly and hug the internal surface of said mold in vault fashion.

7. In apparatus for the production of tubular cylindrical bodies, the improvement claimed in claim 1, in which said mold includes a removable segment whereby said endless travelling belts can be slipped easily over the end edges of said mold.

8. In apparatus for the production of tubular cylindrical bodies, the improvement claimed in claim 1, in which said roller means includes axially spaced races extending circumferentially around the outer periphery of said mold; a stand carrying rolls engaged with said races and driving means for said rolls; the mold being rotatably supported on rolls mounted on bearing housings supported on said standard and spaced circumferentially around a circle concentric with the axis of said mold; said rolls including a bottom roll engaged with each race; motor means operable to drive at least said bottom rolls to rotate said mold; carriages adjustably mounted on said standard and fixable in adjusted position and supporting said bottom rolls; bearing arms pivotally mounted on said standard for pivoting toward and away from said races; means for adjusting and maintaining the pivoted position of said bearing arms; each bearing arm supporting a roll engaged in a respective race; whereby tubular cylindrical molds of different diameters or having different inside clearances may be interchangeably mounted on said standard.

9. In apparatus for the production of tubular cylindrical bodies, the improvement claimed in claim 1, including a short pipe section telescopable into the discharge end of said mold in advance of a tubular cylindrical body producing operation and capable of being bound in by the initial layer of the deposited layer-forming material; said pipe section extending outwardly of the discharge end of said mold; said feed devices exerting a high tensile strength on said pipe section and on the formed tubular cylindrical body to advance the tubular cylindrical body axially out of the mold as it is formed.

10. Apparatus for the production of tubular cylindrical bodies, as claimed in claim 1, in which each feed device comprises a pair of axially spaced annular bearing races supporting a plurality of circumferentially spaced rotatable rolls engageable with the formed tubular cylindrical body; said rolls exerting a preselected frictional pressure on the external surface of the formed tubular cylindrical body; each roll rotating in a diametric plane which extends at an angle to the diametric plane through the formed tubular cylindrical body and through the mold; the angle having a value such that the rolls exert, on the rotating tubular cylindrical body, a screw action effecting axial advance of the tubular cylindrical body.

11. In apparatus for the production of tubular cylindrical bodies, the improvement claimed in claim 10, in which the angles of the planes of rotation of said rolls with respect to a diametric plane through said mold are adjustable to adjust the rate of advance of the forward tubular cylindrical body.

12. In apparatus for the production of tubular cylindrical bodies, the improvement claimed in claim 11, including means interconnecting each pair of bearing races against axial displacement; said bearing races being angularly displaceable relative to each other; said rolls being mounted on axles engaged in bearings which are pivotal about articulated axles extending radially of the axis of said bearing races; whereby angular adjustment of said rolls can be effected by a relative angular displacement of the bearing races of the associated pair.

* * * * *